(12) United States Patent
Galliker

(10) Patent No.: US 11,875,004 B2
(45) Date of Patent: Jan. 16, 2024

(54) OPTICALLY TRANSPARENT CONDUCTOR ASSEMBLY WITH ELECTRICAL TRACKS AND TOUCH SENSOR COMPRISING THE SAME

(71) Applicant: Scrona AG, Adliswil (CH)

(72) Inventor: Patrick Galliker, Horgen (CH)

(73) Assignee: Scrona AG, Adliswil (CH)

( * ) Notice: Subject to any disclaimer, the term of this patent is extended or adjusted under 35 U.S.C. 154(b) by 202 days.

(21) Appl. No.: 17/432,329

(22) PCT Filed: Feb. 20, 2019

(86) PCT No.: PCT/EP2019/054155
§ 371 (c)(1),
(2) Date: Aug. 19, 2021

(87) PCT Pub. No.: WO2020/169188
PCT Pub. Date: Aug. 27, 2020

(65) Prior Publication Data
US 2022/0206637 A1 Jun. 30, 2022

(51) Int. Cl.
*G06F 3/044* (2006.01)
(52) U.S. Cl.
CPC .. *G06F 3/0446* (2019.05); *G06F 2203/04103* (2013.01)
(58) Field of Classification Search
CPC ......... G06F 2203/04112; G06F 3/0446; G06F 2203/04103; A21B 3/155; A61F 2002/30914
See application file for complete search history.

(56) References Cited

U.S. PATENT DOCUMENTS

| | | | |
|---|---|---|---|
| 9,285,942 B1* | 3/2016 | Guard | G06F 3/0445 |
| 10,336,071 B2 | 7/2019 | Poulikakos et al. | |
| 2011/0102370 A1* | 5/2011 | Kono | H03K 17/9622 |
| | | | 200/600 |
| 2011/0148780 A1* | 6/2011 | Lu | G06F 3/0446 |
| | | | 29/829 |

(Continued)

FOREIGN PATENT DOCUMENTS

| | | |
|---|---|---|
| EP | 3 438 800 | 2/2019 |
| WO | 2016/120381 | 8/2016 |
| WO | 2016/169956 | 10/2016 |

OTHER PUBLICATIONS

International Search Report for PCT/EP2019/054155, dated Nov. 12, 2019, in English.

(Continued)

*Primary Examiner* — Amy Onyekaba
(74) *Attorney, Agent, or Firm* — GREENBLUM & BERNSTEIN, P.L.C.

(57) ABSTRACT

A touch sensor has a first and a second set of tracks arranged on a substrate. The tracks have a small width of less than 10 micrometers that renders them invisible to the naked eye. At the same time, neighboring parallel tracks are located at less than 200 micrometers from each other for macroscopic uniformity. The two sets of tracks may include interrupted tracks to reduce mutual capacitance and to increase sensitivity. The tracks can be meandering for optical anisotropy. The touch sensor can be manufactured using electrohydrodynamic ejection printing.

24 Claims, 7 Drawing Sheets

(56) References Cited

U.S. PATENT DOCUMENTS

| | | | | |
|---|---|---|---|---|
| 2012/0031746 A1* | 2/2012 | Hwang | ............... | H05K 3/4611 |
| | | | | 216/16 |
| 2013/0222325 A1* | 8/2013 | Cok | ............. | G06F 3/0446 |
| | | | | 200/600 |
| 2013/0327560 A1* | 12/2013 | Ichiki | ............ | H01B 5/00 |
| | | | | 174/133 R |
| 2014/0041924 A1* | 2/2014 | Cok | ............. | H05K 1/11 |
| | | | | 174/268 |
| 2014/0050840 A1* | 2/2014 | Byun | ............. | G06F 3/0443 |
| | | | | 427/125 |
| 2014/0063374 A1* | 3/2014 | Kuriki | ............ | H05K 1/0274 |
| | | | | 174/250 |
| 2014/0063375 A1* | 3/2014 | Kuriki | ............ | G06F 1/1692 |
| | | | | 174/253 |
| 2014/0071358 A1* | 3/2014 | Kuriki | ............ | H05K 1/0274 |
| | | | | 349/12 |
| 2014/0291008 A1* | 10/2014 | Huang | ............. | H05K 1/0296 |
| | | | | 174/268 |
| 2014/0293154 A1* | 10/2014 | Philipp | ............ | G02F 1/134309 |
| | | | | 349/12 |
| 2015/0177867 A1* | 6/2015 | Chung | ............. | G06F 3/0446 |
| | | | | 427/79 |
| 2015/0338739 A1* | 11/2015 | Lushington | ............ | G03F 7/30 |
| | | | | 430/325 |
| 2015/0338969 A1* | 11/2015 | Lushington | ......... | G06F 3/04164 |
| | | | | 345/173 |
| 2015/0373838 A1* | 12/2015 | Sawada | ............. | H01B 1/24 |
| | | | | 428/209 |
| 2016/0029475 A1* | 1/2016 | Hwang | ............. | H05K 1/097 |
| | | | | 427/532 |
| 2016/0282973 A1* | 9/2016 | Kholodenko | ......... | G06F 3/0443 |
| 2017/0090664 A1* | 3/2017 | Zheng | ............. | G06F 3/0445 |
| 2017/0220161 A1* | 8/2017 | Lee | ............. | G06F 3/0412 |
| 2018/0098422 A1* | 4/2018 | Kuchiyama | ......... | H01L 31/1884 |
| 2018/0107304 A1* | 4/2018 | Hara | ............. | G06F 3/0445 |
| 2018/0181234 A1* | 6/2018 | Hammura | ............ | G06F 3/0446 |
| 2019/0095037 A1* | 3/2019 | Kim | ............. | G06F 3/0446 |
| 2020/0033999 A1* | 1/2020 | Xie | ............. | G06F 3/0447 |
| 2020/0310584 A1* | 10/2020 | Hirano | ............. | G06F 3/0445 |

OTHER PUBLICATIONS

International Written Opinion for PCT/EP2019/054155, dated Nov. 12, 2019, In English.

* cited by examiner

OPTICALLY TRANSPARENT CONDUCTOR ASSEMBLY WITH ELECTRICAL TRACKS AND TOUCH SENSOR COMPRISING THE SAME

TECHNICAL FIELD

The invention relates to an optically transparent conductor assembly with electrical tracks. It also relates to a spatially resolving capacitive touch sensor comprising said conductor assembly and a touchscreen comprising such a touch sensor, as well as to a method for manufacturing said conductor assembly and touch sensor.

BACKGROUND ART

Assemblies of this type are often implemented as so-called metal-mesh transparent conductors (TCs), and they are often used as spatially resolved capacitive touch sensors, e.g. in touchscreens.

They are transparent (in a direction perpendicular to the plane of the substantially 2-dimensional conductor assembly) while still conducting electricity (in a direction along said plane).

One class of such assemblies uses thin film tracks that are conductive and optically transparent at the same time. Such tracks can be made from transparent conductive oxides (TCOs), e.g. indium tin oxide (ITO), and TCs made of this material are the most widely used in industry today. It must be said that ITO and similar materials are neither good conductors nor are they good light transmitters. Therefore, increasing conductivity comes with strong compromises on transparency.

Another class of such assemblies rely on covering only small parts of the conductor assembly's plane with a fine mesh of material that is highly conductive but optically absorbing, e.g. silver or another metal.

In principle, metal meshes can achieve superior properties to TCOs. They are e.g. used in solar cells where the transparency/resistivity ratio must be much higher than what can be achieved by TCOs. However, in this case the metal meshes are made of tracks that are up to 0.1 mm wide. This large width allows them to be thicker (tens of micrometres) without obtaining unsustainable aspect ratios (defined as the ratio of track height and track width). The tracks are spaced by several mm in order to keep overall transparency high. They are readily visible to the unaided eye at any observation angle. However, even tracks much smaller than 0.1 mm will still be visible to the unaided eye due to their absorption, diffraction and/or reflection.

The effect of metal track reflection may be reduced by forming a black coating on the surface of the metal itself, at least in the direction where illumination comes from. This involves additional process steps and potentially a reduction of the conductivity if the blackening affects the electrical properties of the metal.

Further, the regular pattern of tracks in the conductor assembly can give rise to Moiré-effects when placed over a display having a regular pixel pattern.

DISCLOSURE OF THE INVENTION

Hence, in one aspect, the problem to be solved by the present invention is to provide a high-resolution conductor assembly of the type mentioned above that is hard to see by the unaided eye.

This problem is solved by the optically transparent conductor assembly of claim 1.

Hence, the optically transparent conductor assembly comprises at least the following elements:

A transparent substrate: It is typically of a transparent material, such as glass or polymer. The substrate defines perpendicular directions X and Y in the plane of the substrate (i.e. X and Y are parallel to the substrate's outer surfaces).

A plurality of conducting tracks of non-transparent material positioned by said substrate: The tracks are conducting lines. The tracks have a width of less than 10 µm. The substrate "positions" the tracks in the sense that it defines their position. For example, the tracks can e.g. be applied to an outer surface of the substrate and/or they may be embedded within the substrate.

At least some of the tracks are members of a first set of tracks and extend parallel to each other along direction X.

For each of the tracks, and along both the directions X and Y, the distance between the track and a next one of the tracks is less than 200 µm, in particular less than 150 µm.

This design ensures that for a typical viewing distance of e.g. 50 cm, the individual tracks cannot be resolved by the unaided eye.

In addition, the mutual distance of less than 200 µm between the parallel tracks contributes to an overall visual homogenization because the effects of two neighboring tracks cannot be visually distinguished.

In this context, "mutual distance" for parallel tracks, is advantageously defined as the center-to-center distance between neighboring tracks. For nonparallel tracks, it is advantageously defined as the closest edge-to-edge distance minus the width of the thicker one of the two tracks.

The parallel alignment of the track of the first set further adds to the assembly's optical homogeneity and simplifies manufacture.

In particular, when the conductor assembly is optimized for a viewing distance of 25 cm, the tracks should have a width of less than 5 µm and/or the mutual distance between neighboring tracks of the set should be less than 100 µm, in particular less than 75 µm.

Advantageously, at least 90% of the tracks of the first set of tracks (e.g. with the exception of the tracks at the borders of the assembly) have at least one track of said first set—in particular two neighboring, parallel tracks of said first set on opposite sides—within a distance of less than 200 µm, in particular at a distance of less than 150 µm, less than 100 µm, or less than 50 µm, respectively.

For the substrate there is defined a top and a bottom side. The top side of the substrate defines the side of the substrate that will advantageously face a user when operating the substrate. Advantageously, in a sectional view extending perpendicularly to the (local) longitudinal direction of each track, the surface of the track, which is the track's side facing in the same direction as the top side of the substrate, is rounded. In this case, collimated light of a light source, e.g. of the sun, does not remain bundled but is diffusively reflected. For an assembly of tracks this means that there is a constant reflection at any viewing angle rather than a very strong, specular-type reflection at a very specific angle. This renders the tracks harder to see.

The tracks should be "high" as compared to their width in order to combine good conductance and low coverage. However, they should not be too high for mechanical stability. Defining the aspect ratio $r=h/w$ as the ratio between the height h of said tracks in a direction perpendicular to said substrate and the width w of said tracks in a direction perpendicular to a (local) longitudinal direction of said tracks and parallel to a surface of said substrate, one or both of the following conditions should be fulfilled for at least some—in particular for all—of said tracks:

r is at least 0.5, in particular at least 1.0 and/or r is no more than 10, in particular no more than 5.

In order to avoid a too large local coverage, the distance between any parallel neighboring tracks should advantageously be at least 10 μm, in particular at least 20 μm.

Advantageously, the density of conductive material that is observed by a viewer that faces the top side of the substrate is similar everywhere. Thus, a uniform perceptible level of absorption and reflection is achieved over all the conductor assembly. This can be achieved, e.g. by distributing metal tracks such that, in a projection perpendicular to a surface (e.g. the top surface) of the substrate, the standard deviation in the size of the area not covered with conductive tracks, within arbitrary squares of 200 μm×200 μm, is less than 10%, in particular less than 2% of an average value of opened area. In other words, for each such arbitrary square, the square is viewed from a direction perpendicular to the substrate and the fraction of said square not containing metal tracks is calculated (which is a value between 0 (all of the square is covered by metal tracks) and 1 (nothing is covered by metal tracks). This fraction has, over the arbitrary squares, a standard deviation below said limits.

Advantageously, the distances between close parallel tracks should all be similar everywhere. Thus, a more uniform perceptible level of absorption and reflection is achieved over all the conductor assembly. This can e.g. be achieved by making sure that said distances between neighboring parallel tracks are closer than 200 μm and have a standard deviation of no more than 30%, in particular no more than 10%, of an average value of the mutual distances.

In one embodiment, the distance between neighboring parallel tracks closer than 200 μm is constant over the whole conductor assembly, therefore yielding maximum uniformity of the whole assembly surface.

In another embodiment, the distance between neighboring parallel tracks closer than 200 μm fluctuates over the assembly, which reduces the risk of Moiré effects with any adjacent structure, such as the pixel pattern of a display device. In this case, the standard deviation of the distances may be at least 5% of the average value of the distances. However, advantageously, it is still no more than 30%, in particular no more than 10% of said average value.

However, regions where many large distances are adjacent to each other should be avoided. Instead, the track spacings should be distributed such that the material coverage over the distance of 0.5 mm does not fluctuate by more than 10%. However, within the whole assembly, the distances should be as random as possible. A main benefit of non-uniform distances is the improved rotational invariance, which means that the visibility of any Moiré pattern does not strongly depend on how the assembly is rotated with respect to e.g. a second such assembly or a display. Random assemblies have the great benefit that without computational effort and customized designs, the uniformity for almost any combination of assemblies and displays can be kept low.

A further way to reduce visibility is by replacing straight tracks with curved tracks or otherwise non-straight tracks. This can e.g. be achieved by having at least one meandering track, i.e. a track having a series of periodic, alternating left and right turns. The problem with straight tracks is that they will reflect or scatter light in an anisotropic manner, meaning that light coming from one direction will be reflected much stronger than light coming from another direction. Also, absorption and reflection can become polarization-dependent, which e.g. can lead to undesired effects in combination with certain types of displays or sunglasses. If the tracks are not meandering, but still non-straight, then, for manufacturing reasons, the tracks should still have a periodic path.

The length of the period of such a non-straight track sub-element, in particular meander element, is advantageously less than twice the distance between neighbouring tracks, in order to be invisible to the unaided eye. In addition or alternatively thereto, it should be smaller than 400 μm, in particular smaller than 200 μm for the same reason.

Also, for easier manufacturing, all parallel tracks should follow identical meanders such that they can all be manufactured in a single process as described below.

For further reducing the visibility of the tracks, the tracks can be covered with optically absorbing cover layers on at least one side of the assembly. In this context, an absorbing cover layer is advantageously a layer having an optical reflectivity over the visible spectral range (at wavelengths between 400 nm-750 nm) of less than 0.3 and lower than the reflectivity of the tracks themselves.

Advantageously, the assembly comprises a first set of tracks, wherein said tracks of the first set are parallel to each other. In one embodiment, a majority of said tracks, in particular all said tracks, of the assembly, are parallel to each other. However, the assembly may comprise further tracks not parallel to the first set of tracks.

Depending on application, all tracks of the assembly may extend over the whole assembly, or some or all of them may extend only over part of the assembly and/or may be interrupted by gaps.

With only one set of parallel tracks, the assembly will conduct current in only one direction. Where a two-dimensional conductivity is required, tracks can be formed that extend in at least two directions. In particular, tracks of two directions can be combined in overlapping configuration at a mutual rotation of 90°. Such tracks that extend in two or more directions may share a common plane on or within the substrate, or at least part of them can be formed on different planes on or within the substrate.

The overall area of the conductor assembly is advantageously at least 1 cm×1 cm, in particular at least 5 cm×5 cm. It may further comprise a bezel or margin region where there are e.g. thicker or denser tracks or tracks having other properties that differ from the ones specified here.

In addition, e.g. in the application as a spatially resolving capacitive touch sensor (for detecting e.g. finger position or fingerprints), some of the tracks are members of a second set of tracks, with all tracks of the second set of tracks being parallel to each other. The first and second sets of tracks intersect and thereby form individually addressable sensing regions.

Advantageously, the first and second sets of tracks extend perpendicularly to each other.

The tracks in the second set of tracks also may have all properties of the tracks of the first set of tracks as described above, and in particular they have advantageously a width of less than 10 μm. However, the distance between neighbouring tracks of the second set of tracks may exceed, at least on some places, 200 μm. In one embodiment, at least 25% of the tracks of the second set of tracks may have parallel neighbours within a distance of no more than 200 μm.

The first and second set of tracks can be commonly mounted to a common surface of the substrate.

Alternatively, the first and second set of tracks, or part of them, can be mounted to different surfaces of the substrate, e.g. to opposing surfaces of a single substrate or to inner and/or outer surfaces of different sublayers of a multilayer substrate. Advantageously, if the first and second set of tracks are formed on the same surface of the substrate, crossing points are formed where the tracks of the two sets intersect. At least at some of said crossing points, the conductor assembly comprises a dielectric insulator electrically insulating the tracks of the first and the second sets.

In particular, the invention relates to a touch sensor or fingerprint sensor with such a conductor assembly. It may have a controller having transmission outputs and sensing inputs. In this case, at least part of the first set of tracks may be connected to the transmission outputs and at least part of said second set of tracks may be connected to the sensing inputs.

The touch sensor can e.g. be used in a touchscreen where it is e.g. arranged over a display.

The invention also relates to a method for manufacturing the conductor assembly, touch sensor, or fingerprint sensor comprising the step of applying said tracks to said substrate using non-contact ejection printing. In this context, "non-contact ejection printing" describes the application of a precursor material of the tracks being dissolved, dispersed or otherwise stabilized within a liquid solvent from a printing head located at a distance from the substrate, with the precursor being applied as a plurality of droplets or jets ejected from nozzles in in the printing head, wherein upon impact on the surface the liquid solvent normally evaporates, while the precursor material remains.

Advantageously, electrohydrodynamic ejection printing is used for this purpose. In this process, the droplets or jets are generated and accelerated using electrical fields.

BRIEF DESCRIPTION OF THE DRAWINGS

The invention will be better understood and objects other than those set forth above will become apparent when consideration is given to the following detailed description thereof. This description makes reference to the annexed drawings, wherein.

MODES FOR CARRYING OUT THE INVENTION

Definitions

A "transparent substrate" or "transparent conductor assembly" is advantageously a substrate or assembly having, for at least a subrange in the visible wavelength range of 400-750 nm, a transmission of at least 50%, in particular of at least 60% or at least 80%. Advantageously, said transmission is spatially uniform across the substrate or assembly and/or uniform over the indicated wavelength range (i.e. the material is colorless).

A "track" is a line of a conducting material having a length much larger than its width.

A "conducting" material in the present context is advantageously a material having a conductivity of at least $10^5$ S/m at room temperature, in particular at least $10^6$ S/m.

Figure 1:
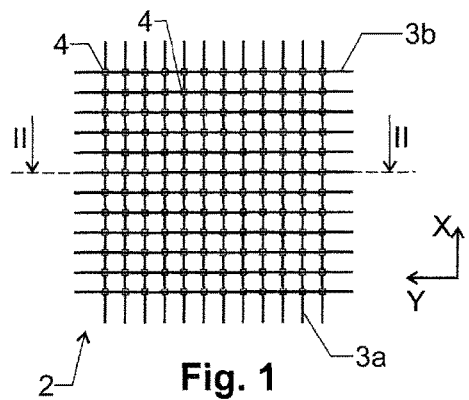
FIG. 1 shows a first embodiment of a two conductor assemblies from above.
Figure 2:
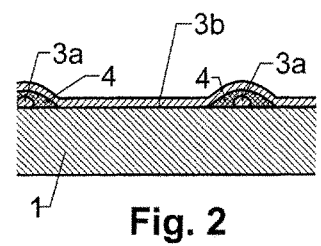
FIG. 2 is an enlarged, sectional view along line II-II of FIG. 1.

Conductor Assembly:

FIGS. 1 and 2 shows a conductor assembly 2 with a single-layer substrate 1.

Substrate 1 is a transparent body extending along a plane defined by two orthogonal directions X and Y. It advantageously has two parallel outer surfaces parallel to the plane defined by X and Y and its extensions along X and Y both are much larger than its thickness perpendicular to X and Y, in particular at least 100 times larger.

Conductor assembly 2 has a first set of parallel tracks 3a and a second set of parallel tracks 3b.

The two sets of tracks 3a, 3b of the shown embodiment are arranged perpendicular to each other. For many applications, perpendicularity is not required, though. Hence, in more general terms, the two sets of tracks 3a, 3b are transversal to each other. For example, the angle between the longitudinal directions of the tracks of the two planes may e.g. be at least 45%, in particular at least 60%.

Furthermore, further tracks can be formed on the substrate that neither belong to the first nor second sets of tracks, and hence they may follow different directions than the tracks of the first or second set of tracks.

Without loss of generality, it is assumed that one set of tracks extends parallel to direction X.

In the present embodiment, at the crossing points between tracks of different sets, a dielectric insulator 4 is provided for electrically insulating the tracks 3a, 3b.

Advantageously, and in any of the embodiments shown herein, dielectric insulator 4 can be formed by a plurality of individual insulating patches, with one patch located at each crossing point to be insulated. Alternatively, though, the dielectric insulator 4 can be a continuous layer that spans several or all crossing points, i.e. in this case the two metal tracks are formed on different sub surfaces of the multilayer substrate.

Figure 3:
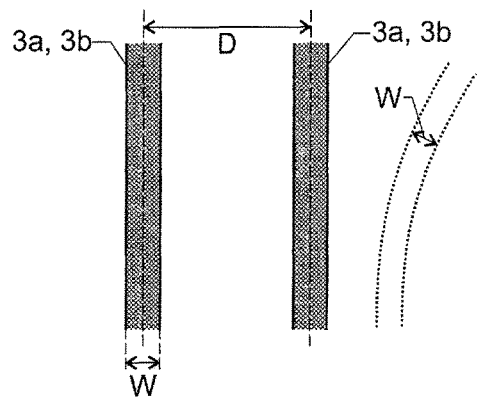
FIG. 3 illustrates the definition of track width and distance.

FIG. 3 shows the mutual distance D between two neighboring, parallel tracks 3a or 3b, which is defined as the center-to-center spacing between the tracks. It also shows the width W of the tracks, which is defined as the extension of a track perpendicular to its (local) longitudinal direction. "Local" longitudinal direction expresses the fact that, in case the track is curved, e.g. meandering, the width is understood as the local width along the current direction of the track, as it is illustrated in dotted lines in FIG. 3.

The conditions to be fulfilled by distance D and width W in order to generate an optically homogeneous assembly are described above.

The tracks 3a, 3b are of an electrically conducting material, e.g. comprising or consisting of at least one of a metal or metal alloy (e.g. silver, copper, gold, etc.), TiN, ITO, graphene, and carbon nanotubes. Typically, the material of the tracks 3a, 3b is optically absorbing and/or strongly reflecting, in particular such that a solid layer of 100 nm thereof has transmission of less than 10% over the visible wavelength range of 400 to 750 nm.

Dielectric insulator 4 is advantageously of an electrically non-conducting material, such as a material comprising a bulk conductivity of less than 1 S/m, preferably of less than $10^{-10}$ S/m. Preferably the insulator is itself transparent as defined above, e.g. by being made of Quartz, Sapphire or a glass or ceramic. The insulator may also be formed from soft materials like SU8 or a varnish. The insulators 4 should have a lateral extension larger than the width of any of the crossing tracks, at least at the crossing point. In case the insulator consists of a non-transparent or colored material, the width of the insulator 4 should not be more than twice as wide as the width of the crossing tracks. The thickness of the insulators is advantageously at least 20 nm, in particular at least 100 nm, in particular at least 1 µm. The insulators are advantageously beveled or rounded at the side facing away from substrate 1, and their aspect ratio (height perpendicular to substrate 1 divided by width along the substrate) is advantageously less than 1 in order to further ease the formation of tracks across them.

Substrate 1 is transparent as defined above. It can e.g. be at least one of glass, sapphire, quartz, and a polymer.

The substrate advantageously has an electrical conductivity that is at least 10 times lower than the conductivity of the material that the conducting tracks are made of, in particular its electrical conductivity is at least 1'000 times lower. This is of particular advantage in touchscreen or fingerprint sensor applications, but it is not required in some other applications.

In the embodiment of FIG. 2, both sets of tracks 3a, 3b are mounted on the same side to the same substrate 1.

Alternatively, the tracks 3a, 3b may be mounted to opposite sides of the same substrate 1.

In yet another alternative, substrate 1 may be a multilayer substrate, i.e. it can comprise several sublayers stacked onto each other, such as a stack of plastic or glass plates or a combination of the two. In this case, the two sets of tracks 3a, 3b may be arranged on the surfaces of different sublayers.

A single conductor assembly may e.g. be used in one of the following applications:

It can be used as a touch sensor.
It can be used as a fingerprint sensor.
It can be used as a heating element for a transparent window, e.g. in order to prevent condensation on the window.
It can be used to collect charge on a solar cell.
It can be used for transparent EMF shielding.

The use of the conductor assembly in the application as a touch sensor or a fingerprint sensor are described below.

Basic Design of a Touch Sensor or Fingerprint Sensor:

In the following, a basic design is described by reference to the embodiment of FIGS. 1 and 2.

The tracks 3a, 3b form transmission bands and sensing bands extending at an angle to each other.

As explained in detail below, all tracks within a certain band can be shorted by a busbar and connected to a separate voltage source. In this way, all tracks within such a band will carry the same voltage, but any two bands can carry different voltages.

The width of the bands is generally at least 1 mm, typically about 5 mm for applications where the position of a finger's touch is to be detected. In some applications, such as e.g. in a fingerprint sensor, the width of the bands can be lower, e.g. in the range of 50 to 500 µm.

By overlaying sets of tracks, the bands are e.g. perpendicular to each other and cross at given positions. The size of those crossing regions is given by the width of the top band multiplied by the width of the bottom band. In general, the width of top and bottom is identical though.

In the shown embodiment, one of the sets of tracks acts as the sensing and the other as the transmission channel. The sensing channel is always on ground. In contrast to this, one of the transmission bands carries a non-grounded voltage signal, generally on the order of 1 V. All other transmission bands are grounded as well. By applying a voltage to one of the transmission bands, an electrical charge is stored within the capacitor that is formed at the crossing points between the activated transmission band and the underlying sensing bands. However, the capacitance at each of those intersections is not only defined by the design of the conductor assemblies, but it can be influenced by the usually grounded finger of a user. The finger will never touch one of the tracks directly.

As mentioned above, substrate 1 may be a single-layer substrate or a multilayer substrate.

Advantageously, the two sets of tracks are formed on the same surface of the substrate, with the insulators 4 at any crossing points where insulation is required.

The tracks should be separated from the finger by at least one dielectric layer, advantageously a thin layer having high permittivity.

If the sets of tracks are formed on opposite, outer sides of the substrate, it is advantageous to cover one side with an insulating layer. Alternatively, one of the sublayers of the substrate may also act as an insulating layer for the finger.

The finger couples to the sensing band. This leads to a change in capacitance and hence to a change in the charge that is stored at the intersections. Therefore, upon charging the capacitors, it will be possible to evaluate which crossing region(s) is/are at least partially covered by the finger.

The change in capacitance upon finger touch is typically in the order of a few percent. In absolute numbers, the minimum change that be registered by current electronics is in the IF range. In order to be able to distinguish partial and full finger touch or even finger approaches, the change in capacitance by a full finger touch is advantageously in the order of tenths of pF. Given the change in signal upon full finger touch, it is important to keep the capacitance without finger touch as low as possible. Not only does this improve signal readability, but it also helps to improve the transparency/resistivity ratio of the conductor assemblies because a smaller capacitance allows using a higher electrical resistance in the tracks without affecting the capacitor charging time.

Hence, it is desired to design the touch sensor such that the capacitance between the transmission and sensing bands without a finger is low.

In the following, various embodiments of touch sensors are described in reference to FIGS. 4-11. Note that the insulators 4 are not shown in FIGS. 4-6, and the upper set of tracks are shown in dotted lines in FIGS. 4-6.

Figure 4:
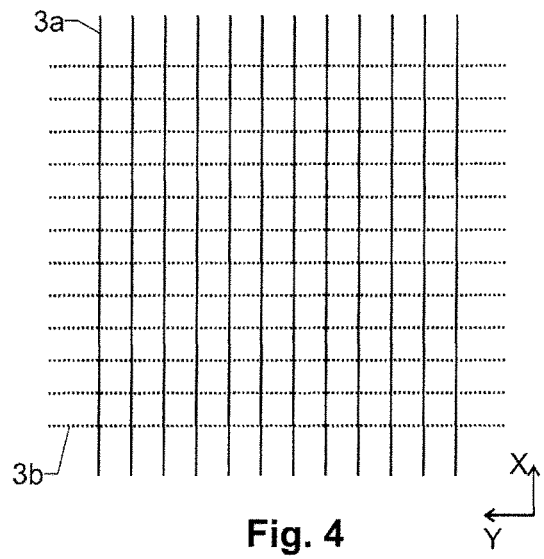
FIG. 4 shows a first embodiment of a touch sensor (with the insulating points not shown and with the upper set of tracks shown with dotted lines)

FIG. 4 shows the basic design of a touch senor. In each set of tracks 3a, 3b, the tracks are parallel to each other and arranged at equal distances D from their neighbors. The two sets of tracks 3a, 3b are mutually orthogonal to each other.

In this embodiment, the two sets of tracks are formed on different surfaces of the substrate (i.e. there are no dielectric insulator points present), and one of the sets of tracks 3a, 3b acts as the sensing and the other as the transmission channel. Each track extends all over the touch sensor, with no breakage.

Figure 5:
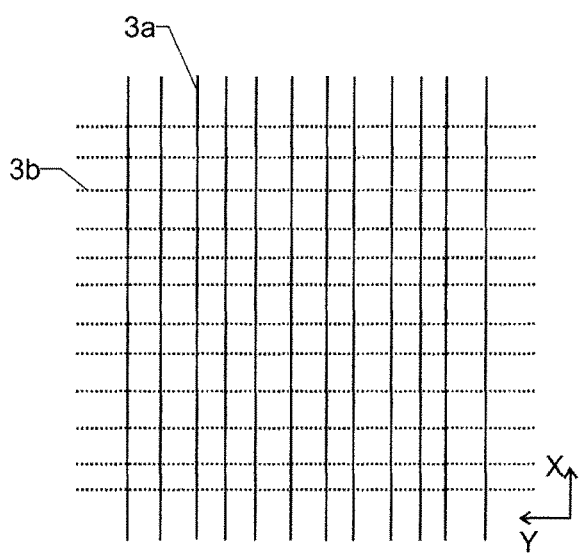
FIG. 5 shows a second embodiment of a touch sensor.

Randomized Track Distance:

FIG. 5 shows a design where the mutual distance D between neighboring, parallel tracks is varied. For the reasons mentioned above, the mutual distances D of each set of tracks 3a, 3b have a standard deviation of no more than 30%, in particular no more than 10%, of an average value of the mutual distances.

Figure 6:
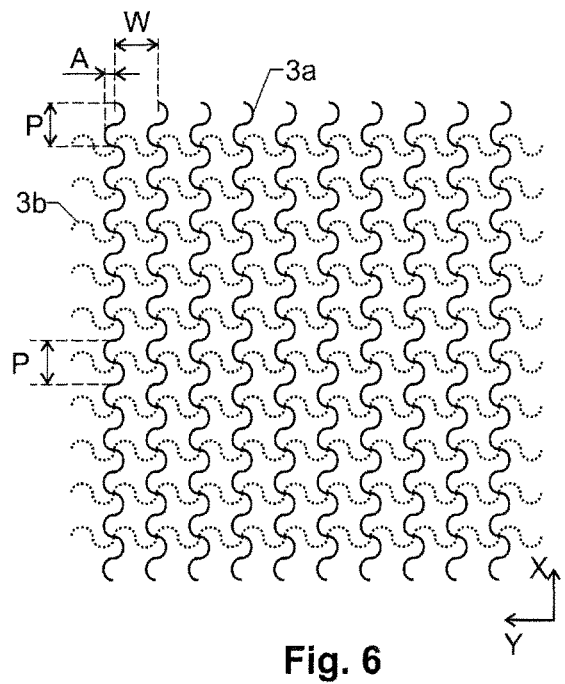
FIG. 6 shows a third embodiment of a touch sensor.

Meandering Tracks:

FIG. 6 shows a design where the tracks 3a, 3b are meandering. For the reasons mentioned above, this allows to improve the sensor's optical uniformity. The meandering tracks may e.g. have alternating 180° right-turns and left-turns of equal curvature, or they may e.g. follow a sinusoidal curve, or they may follow any other periodic pattern. In this case, it does not matter in which direction a track is heading because the tracks will be macroscopically isotropic in their optical properties.

For the reasons mentioned above, the period P of the meandering tracks is advantageously no more than twice the distance W between neighbouring tracks and/or it is less than 400 μm, in particular less than 200 μm.

Advantageously, the period P is equal to the distance W between the tracks of the other set of tracks, or to an integer fraction of said distance W. In this case, all the crossing points between tracks of the two sets look the same.

On the other hand, the period P may advantageously be at least 20 μm to keep it easy to manufacture.

The amplitude A of the meandering tracks (defined as the distance between the track's center and its outmost regions, as shown in FIG. 6) is advantageously at least 15%, in particular at least 20%, of the period P. This ensures that the tracks deviate strongly from a straight line, giving them good optical anisotropy.

On the other hand, the amplitude A is advantageously no more than 40%, in particular no more than 30% of the period P. Again, this helps to maintain optical anisotropy.

Finally, the amplitude A is advantageously less than half the distance W between neighbouring tracks of the same set, i.e. less than W/2, in particular less than W/4, to prevent the tracks from getting too close to each other. This makes the meandering pattern easy to manufacture while hard to detect by the unaided eye.

Figure 7:
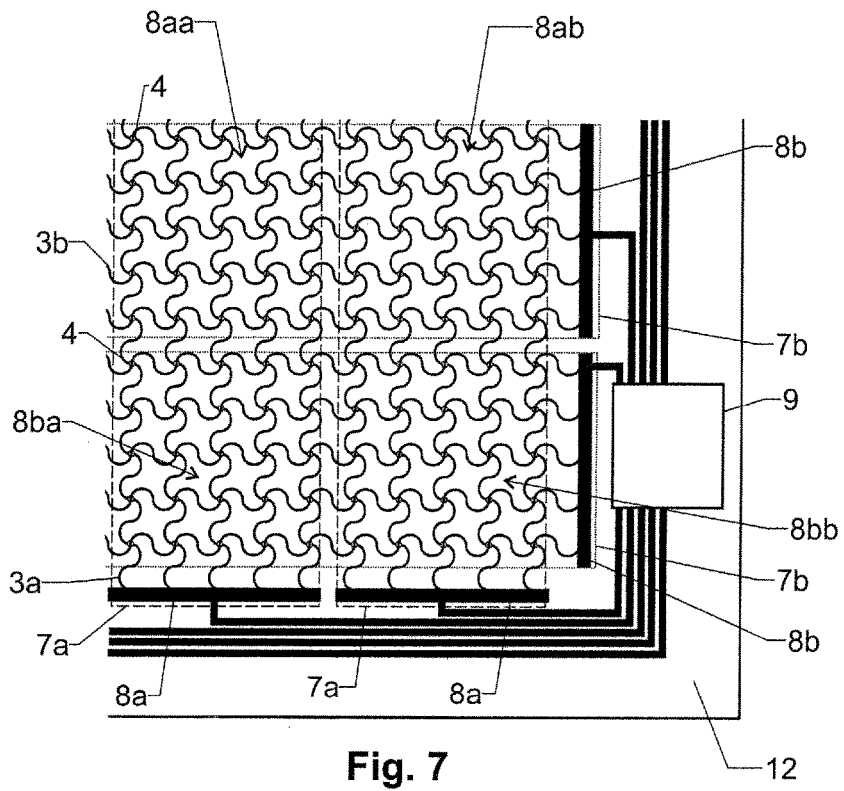
FIG. 7 shows the wiring of a touch sensor with perpendicular transmission and sensing bands.

Advanced Sensing and Transmission Bands:

As mentioned, there may be more than one track per transmission band and per sensing band. This is illustrated in FIG. 7, which shows a corner of the touch sensor of FIG. 6, but with several neighboring tracks of each set of tracks 3a, 3b grouped into a transmission band 7a and a sensing band 7b. In FIG. 7, the regions of the transmission bands 7a are surrounded by dashed lines and the regions of the sensing bands 7b are surrounded by dotted lines.

Thus, the touch sensor forms a plurality of individually addressable sensing regions 8aa, 8ab, 8ba, and 8bb . . . defined by the intersections of the transmission bands 7a and the sensing bands 7b.

The individual tracks 3a of each transmission band 7a are interconnected by first busbars 8a, and the individual tracks 3b of each sensing band 7b are interconnected by second busbars 8b.

Each busbar 8a, 8b is connected to a controller or connector 9 by means of a busbar track 10, some of which are shown in FIG. 7.

The busbars 8a, 8b and busbar tracks 10 are arranged outside the active area of the touch sensor, e.g. in the bezel area 12 of a touchscreen. They can therefore have larger width that the tracks 3a, 3b. Advantageously, the cross section of the busbars 8a, 8b and/or the busbar tracks 10 is at least 10 times, in particular at least 100 times, larger than the cross section of the tracks 3a, 3b.

At the same time, the busbars 8a, 8b and the busbar tracks 10 should still be patterned at high resolution such that the width of bezel region 12 is reduced.

For example, the busbars 8a, 8b and/or the busbar tracks 10 may be formed with a width of 20 μm and a thickness of 10 μm, which represents a fifty time larger cross-section than that of a tracks 3a, 3b with 2 μm width and 2 μm thickness.

Busbars 8a, 8b and/or the busbar tracks 10 are advantageously formed as straight tracks in order to reduce the distance to the controller. Since there is no need to obtain optical uniformity, non-straight tracks would merely increase the resistance.

Reducing Deadweight Capacitance Between the Sets of Tracks:

The designs described so far are particularly suitable for touch sensors where the two sets of tracks 3a, 3b are sufficiently spaced from each other to have inherent low capacitance between the transmission and sensing bands. However, if the two sets of tracks 3a, 3b are formed on the same side of a single substrate (as shown in FIG. 2), the distance between the tracks at their crossing points may be very small, and as a result strong charge clouds will form around these points (i.e. large electric fields). The influence of a finger on this charge cloud (deadweight capacitance) will be small because the dielectric layer that separates the finger from the tracks is generally in the order of several hundred μm, i.e. one or two orders of magnitude larger than the thickness of insulator 4 separating the tracks 3a, 3b. Hence, in order to further improve the capabilities of the touch sensor, more complex designs are advantageously used (note that these designs can also be applied to touch sensors that have their sets of tracks on different surfaces or different substrates) in order to reduce the influence of the charge clouds. This can be achieved in various ways.

In a first approach, a larger mutual distance between the tracks in at least one of the sets of tracks can be introduced. In particular, in at least one of the sets of tracks, the average mutual distance between the tracks can be larger than 200 μm. Furthermore, tracks of the two sets of tracks can be kept from crossing each other by interrupting at least some but not all of the tracks of one set of tracks at the position of a given track of the other set of tracks.

Figure 8A:
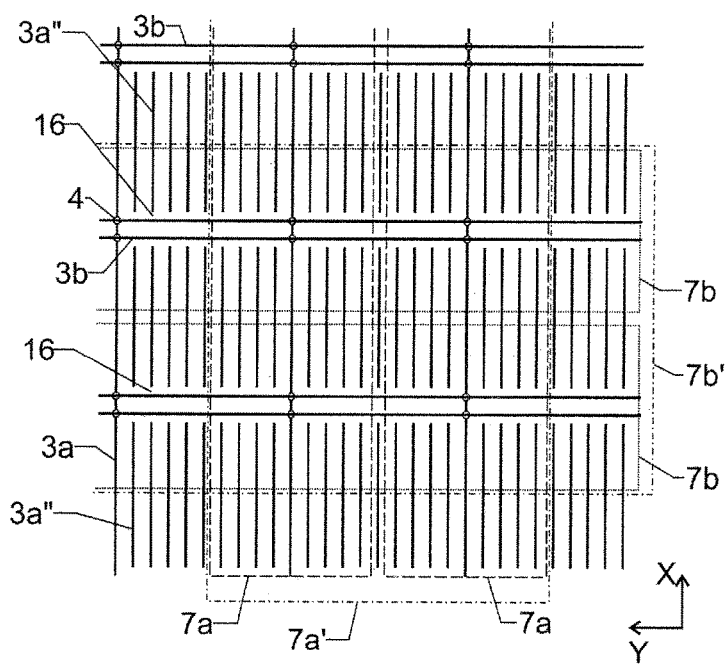
FIG. 8a shows a fourth embodiment of a touch sensor.

FIG. 8a shows a first embodiment of such a touch sensor. As compared to the embodiment of FIG. 4, some of the tracks 3b of the second set of tracks have been omitted. Thus, for at least some neighboring pairs of them, the distance exceeds 200 μm.

The track(s) 3b of each sensing band 7b should be centered on the sensing band 7b.

Furthermore, in FIG. 8a some of the tracks of the first set of tracks 3a have been interrupted with breaks 16 at the position of the tracks of the first set of tracks 3b, such that no deadweight capacitance can form at potential, insulated crossing points between those tracks 3a, 3b. Only the uninterrupted tracks of the first set of tracks 3a are contacted to the transmission busbars, while the interrupted tracks are electrically floating. In FIG. 8a, examples of such interrupted tracks are denoted by reference number 3a″.

In FIG. 8a, only one track of the first set of tracks is contacted to each transmission busbar. In an alternative embodiment, several of the uninterrupted tracks 3a of the embodiment of FIG. 8a may be interconnected by the lateral busbars to form a single transmission band. Similarly, several of the pairs of uninterrupted tracks 3b may be interconnected by the lateral busbars to form a single sensing band. In this way, and as indicated by dot-dashed lines in FIG. 8a, wider bands 7a', 7b' can be created, and hence a resolution of the touchscreen sensor is reduced in favor of an active sensing area per crossing region.

The length of the breaks 16 is selected to maintain a homogeneous macroscopic coverage of the touch sensor with tracks 3a, 3b.

Figure 8B:
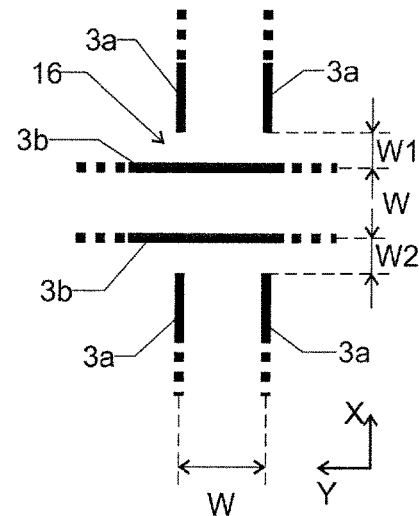
FIG. 8b shows a detail of FIG. 8a, FIG. 9 shows a fifth embodiment of a touch sensor.

For example, and as shown in FIG. 8b, this can be achieved by suitably selecting the distances W1, W2 between the ends of the interrupted tracks 3a and the closest track 3b of the other set, i.e. in the shown embodiment the distances W1, W2 along direction X.

In general, W1 and W2 should be less than 200 μm, in particular less than 150 μm, 100 μm, or 50 μm, respectively, to make the tracks hard to resolve with the unaided eye.

In a particularly homogeneous embodiment, however, the added distances W1+W2 should be equal to the distance W between neighboring interrupted tracks 3a. If there is more than one track 3b of the other set in the break 16, the mutual distance between the tracks 3b in said break 16 should also we equal to the distance W.

The unbroken tracks 3a of the transmission bands still form crossing points with the tracks 3b of the sensing bands, with insulators 4 arranged at the crossing points.

Only at these crossings points, a point of higher material density will occur. Due to the very local and limited amount of material, this can generally be tolerated without noticeable degradation in optical homogeneity.

In the embodiment of FIG. 8b, the unbroken tracks 3b crossing the breaks 16 are centered within the breaks 16 for optimum optical homogeneity.

There are two closely arranged, unbroken tracks 3b arranged within the breaks 16. However, there may be only one track 3b formed within the breaks 16 or there may be more than two unbroken tracks 3b formed within the breaks 16. At given distances W, W1 and W2, increasing the number of unbroken tracks 3b within the breaks 16 will increase the average mutual distance between the unbroken tracks 3b and the interrupted tracks 3a. For example, in FIG. 8b the distance between the upper unbroken track 3b and the interrupted tracks 3a is W1 in one direction and W+W2 in the other direction, perpendicular to the unbroken track 3b. In case only one unbroken track 3b would be formed within the break 16, the distance would still be W1 in the first direction but only W2 in the other direction. Hence, increasing the number of unbroken tracks 3b within the breaks 16 will decrease their sensitivity towards the interrupted tracks 3a. Because the sensitivity towards the finger is generally unchanged, having a larger number of unbroken tracks 3b will generally increase the relative response to a finger touch. At the same time, a smaller average background capacitance will form at the unbroken tracks 3b, which means that a lower conductivity value can be tolerated for the unbroken tracks 3b.

However, this effect is at least partially offset by the fact that each additional unbroken line introduces additional crossing points with the uninterrupted tracks 3a, and thereby the current load (i.e. the current required to charge the corresponding capacitive load) the uninterrupted tracks 3a is increased. As a particular way of optimization, one may increase the number of unbroken tracks 3b within the breaks 16 until the maximum current load per unbroken track 3b becomes equal to the maximum current load per uninterrupted track 3a. Maximum current load here means that, within bundles of unbroken lines of the first or second set of tracks, there can be differences in background capacitance, such that one of the tracks of a bundle will have the highest background capacitance, and hence needs to carry largest currents. The current load of the different tracks of a bundle may be averaged though by forming rectangular interconnect tracks between them. In order to prevent a strong influence on optical uniformity such a single interconnect track may be formed at middle between any two crossing points.

In more general terms, at least some of the tracks of a given transmission band 7a or of a given sensing band 7b may be electrically not only at their ends, e.g. by means of tracks of the respective other set of tracks. In particular, pairs of neighboring tracks of a given band 7a, 7b may be interconnected by a plurality of electrical tracks of the respective other set.

In the present example, there is only one uninterrupted track 3a per transmission band 7a. However, there may also be more than one uninterrupted track 3a per transmission band 7b for improved redundancy. The uninterrupted tracks 3a should be centered on their respective transmission bands 7a.

In addition to this, and as mentioned above in reference to the dot-dashed bands 7a', 7b' of FIG. 8a, several of these sub-bands can be interconnected by a busbar to form a wider band.

The reduction of the number of unbroken tracks per band allows to reduce the number of crossing points. However, the interrupted tracks maintain the homogeneity of the macroscopic coverage and therefore optical density and allow keeping as the minimum required capacitance change small. Furthermore, it is possible to more freely adjust individual quality parameters, and thereby to adjust the device to different application environments.

In general, it should be attempted to distribute conducting material such that for the whole touch sensor, square areas can be defined where the density of metal material is constant, as described in more detail above.

In the embodiment of FIG. 8a, the floating, interrupted tracks 3a improve the sensitivity of the touchscreen sensor to the finger. This is due to the fact that the presence of the finger will directly influence the voltage of the interrupted tracks 3a″. As a result, via the interrupted tracks 3a″, the finger has an additional path of indirectly couple to the unbroken lines 3b of the sensing channel. Similar to the case with the unbroken lines 3b, a higher number of interrupted lines 3a″ being arranged at close separation between uninterrupted lines 3a will increase the relative sensitivity of the interrupted lines 3a to the finger. However, the increased sensibility to the finger is also accompanied by an increased sensitivity to noise signals.

In case it is desired to reduce noise sensibility without reducing the distance between the uninterrupted tracks 3a (which would again increase the number of crossing points), some or all of the floating tracks 3a may be contacted to uninterrupted tracks 3a such that they pick up the voltage of the respective transmission band 7a.

Contacting of floating, interrupted tracks 3a" to the unbroken transmission tracks 3a can be implemented in various ways.

Figure 9:
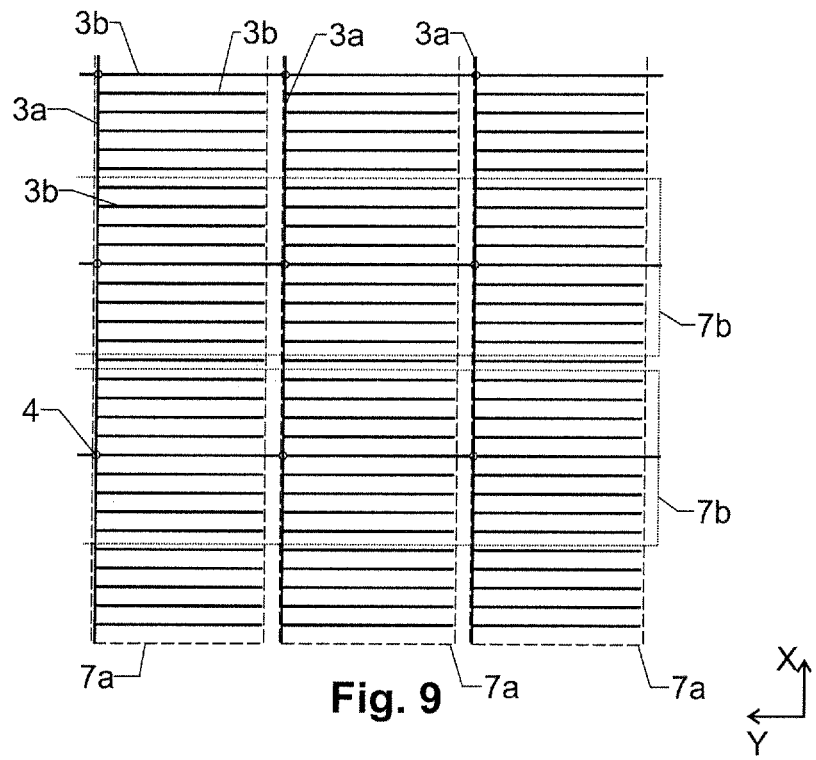

FIG. 9 shows an embodiment of this concept where all interrupted tracks 3a contact an unbroken transmission track.

In this embodiment, the interrupted tracks 3b are parallel to the tracks 3b of the sensing bands 7b, i.e. the interrupted tracks 3b are part of the second set of tracks 3b.

They are symmetrically arranged in between the unbroken tracks 3b of the sensing bands 7b.

At the locations where the interrupted tracks 3b cross the unbroken tracks 3a, they will once more be interrupted at a length equal to W. (In the terms of FIG. 8b, W1 is now zero and W2=W, i.e. W1+W2=W.)

However, in this embodiment, the break is not located centrally at the location of the unbroken track 3a, but instead the interrupted tracks 3b are offset by at least such an amount that they electrically contact the unbroken tracks 3a.

Advantageously, this offset is equal to or only slightly larger than W/2, either in one or the other direction, perpendicular to the unbroken tracks 3a. In this way, the macroscopic material density still remains constant in proximity to the newly formed contact points. Nonetheless, due to the non-central arrangement, there is a slight shift of material density. In order to reduce the visibility of these contact points it is suggested to reduce the width W to half the otherwise maximum distance between tracks.

Contacting all previously floating tracks 3b to the voltage-carrying unbroken tracks 3a reduces noise sensitivity, but it may affect sensitivity to finger touch.

Further design freedom is provided when only part of the interrupted tracks are connected to the unbroken tracks 3a.

Figure 10:
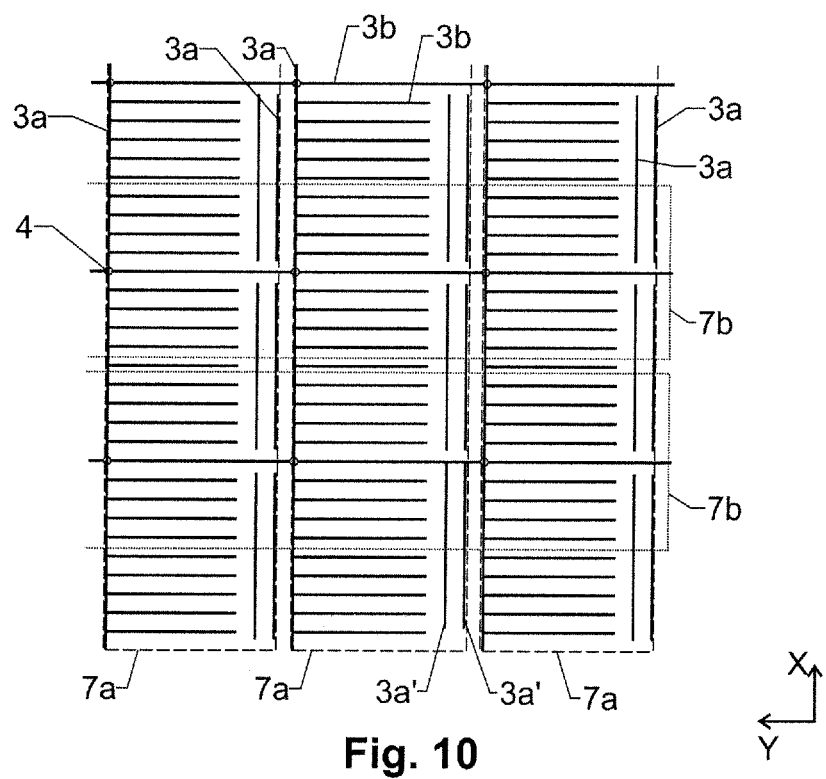
FIG. 10 shows a sixth embodiment of a touch sensor.

FIG. 10 illustrates one way to achieve this. In this embodiment, some of the interrupted tracks are tracks of the second set of tracks 3b, and they are connected to an unbroken track of the first set of tracks 3a, i.e. they are at the potential of one of the unbroken tracks 3a, just as in the embodiment of FIG. 9. On the other hand, some of the interrupted tracks are tracks of the first set of tracks 3a, and they are left electrically floating, just as in the embodiment of FIG. 8a.

Again, the broken tracks are advantageously positioned such that the condition W1+W2=W is maintained.

In an alternative embodiment, at least some of the interrupted tracks of the first set 3a can be connected to an unbroken track of the second set of tracks 3b (i.e. to a sensing track), such as illustrated for tracks 3a' in FIG. 10. This design allows increasing the capacitive coupling between the transmission and sensing bands 7a, 7b in the presence of a finger, without increasing the number of crossing points.

Figure 11:
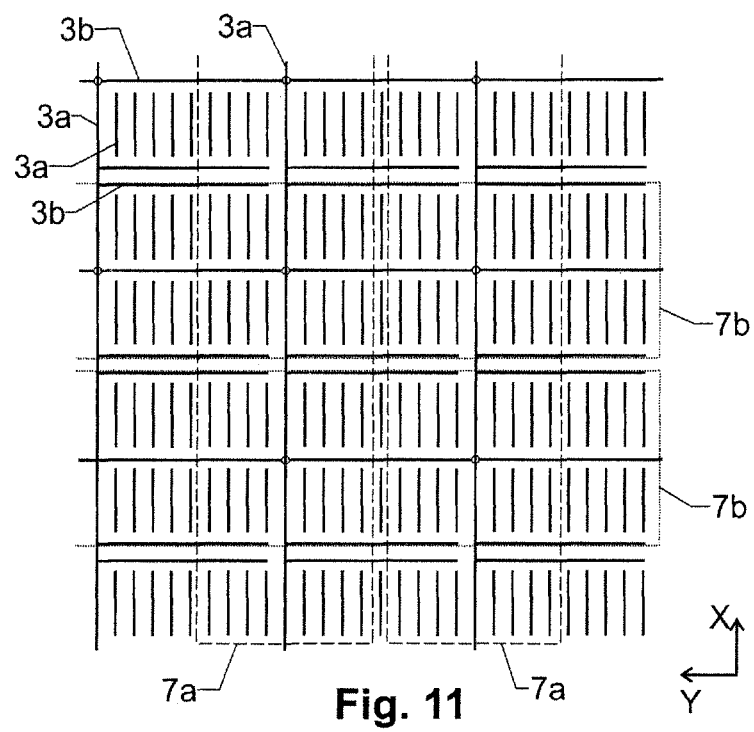
FIG. 11 shows a seventh embodiment of a touch sensor.

FIG. 11 shows yet another embodiment combining floating and non-floating interrupted tracks. Here again, some of the tracks of the second set of tracks 3b are interrupted and electrically connected to uninterrupted tracks of the first set of tracks 3a, and some of the tracks of the first set of tracks 3a are interrupted and left floating.

The embodiments of FIGS. 8-11 are shown with straight tracks. It must be noted, though, that some of them have unequal densities of tracks of the first and the second sets 3a and 3b. In this case, it is of particular advantage to use meandering tracks as e.g. shown in FIGS. 6 and 7 to improve the anisotropy of the optical properties of the touch sensor.

In the embodiments of FIGS. 9, 10, and 11, there are two sets of crossing points between the tracks of the first and the second set of tracks 3a, 3b:

At a first set of the crossing points, the dielectric insulators 4 are provided for electrically insulating the tracks of the first and the second sets of tracks 3a, 3b.

At the second set of crossing points, the tracks of the first and the second sets are electrically connected to each other. Advantageously, at this second set of crossing points, the tracks of one set (e.g. the tracks of the second set of tracks 3b) are interrupted tracks and the tracks of the other set (e.g. the tracks of the first set of tracks 3a) are unbroken tracks.

Figure 12:
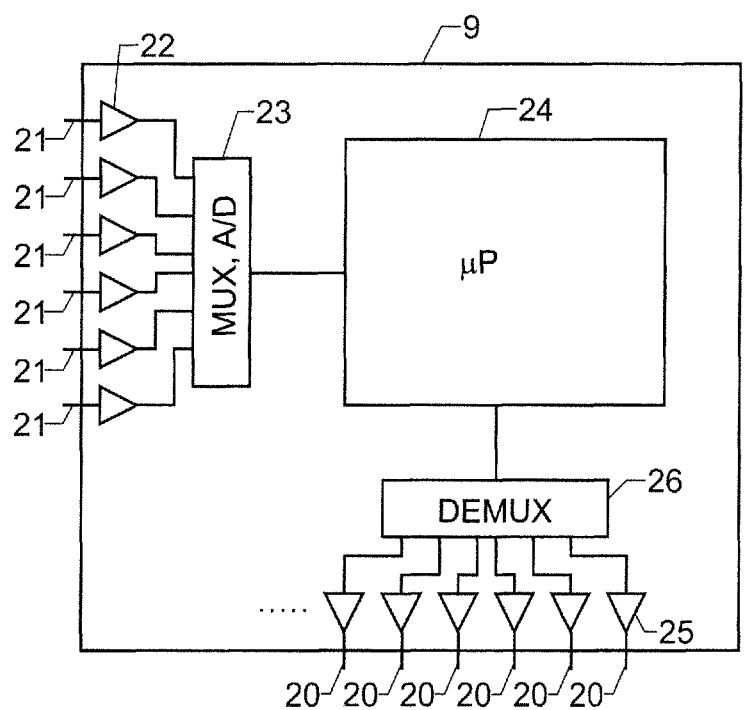
FIG. 12 shows an embodiment of a controller for a touch sensor.

Touch Sensor Controller:

As mentioned before, the touch sensor may comprise a controller 9. FIG. 12 shows an embodiment of such a controller.

Controller 9 has a plurality of low-impedance transmission outputs 20, each one of which is connected to one of the transmission bands 7a. It further has a plurality of high-impedance sensing inputs 21, each one of which is connected to one of the sensing bands 7b.

The signals from the sensing inputs 21 may e.g. be amplified by amplifiers 22, and then they are converted into digital signals, e.g. using a multiplexer and analog-digital-converter 23 for analysis by a microprocessor 24.

Microprocessor 24 controls a plurality of drivers 25 generating the signals at the transmission outputs 20, e.g. via a demultiplexer 26.

In operation, during each operating cycle, one of the transmission outputs 20 at a time is set to "active potential", such as 1 V, while the other ones remain at "inactive potential", such as ground. In the next operating cycle, a next one of the transmission outputs 20 is set to active potential, etc.

During each operating cycle, the voltages at all sensing inputs are queried in order to detect the capacitive coupling between the transmission and sensing bands 7a, 7b.

Controllers of this type are known to the skilled person.

Touchscreen:

The touch sensor can be used in a variety of applications where it is necessary to detect the position of an object in two dimensions.

Figure 13:
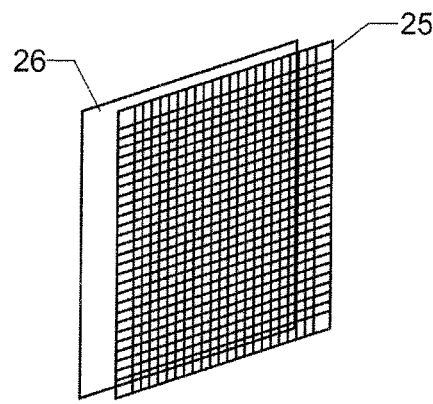
FIG. 13 shows a touch screen with a touch sensor.

In a particularly advantageous embodiment, the touch sensor is used in a touchscreen, as e.g. shown in FIG. 13. Here, the touch sensor 25 is placed over a display 26 such that display 26 can be viewed through touchscreen 25.

In this case, substrate 1 may form an integral part (such as a front cover) of display 26 or it can be a part separate from display 26.

Track Shaping and Reflection Reduction:

For the reasons mentioned above, the aspect ratio r=h/w between the height and the width of the tracks 3a, 3b should be high in order to increase the tracks' cross section and conductance while keeping the optical absorption and reflection low.

Figure 14:
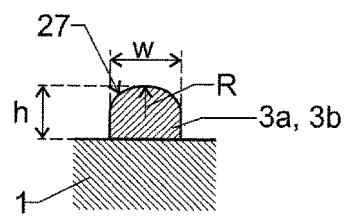
FIG. 14 shows a sectional view perpendicular to the longitudinal direction of a first embodiment of a track.

This is illustrated in FIG. 14. Here, h denotes the height of track 3a, 3b perpendicular to the surface of substrate 1 while w denotes the width of the track perpendicular to its (local) longitudinal direction and parallel to the surface of substrate 1.

Further, and also for the reasons mentioned above, the surface 27 of the track 3a, 3b that faces away from substrate 1 is advantageously rounded. This is also illustrated in FIG. 14.

FIG. 14 shows the curvature R of surface 27 in a sectional view perpendicular to the track's local longitudinal direction. For increasing the divergence in propagation direction of the reflected light, the "rounding" of surface 27 should extend over a large part of surface 27. Advantageously, over at least 50%, in particular over at least 80%, the largest curvature R of surface 27 is no more than the width w the track 3a, 3b. In other words, a small part of surface 27 (i.e. less than 50%, in particular less than 20%) may be flatter.

Figure 15:
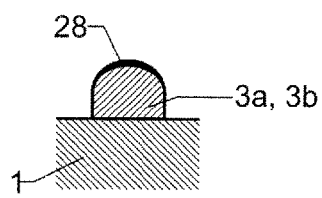
FIG. 15 shows a sectional view perpendicular to the longitudinal direction of a second embodiment of a track.
Figure 16:
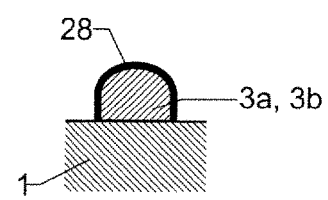
FIG. 16 shows a sectional view perpendicular to the longitudinal direction of a third embodiment of a track.

The optical reflectivity of the tracks 3a, 3b can further be reduced by coating them individually with light-absorptive cover layers 28 as shown in FIGS. 15 and 16. For example, layer 28 may be formed from light-absorbing pigments that are deposited directly on top of the tracks 3a, 3b, for example from black carbon pigments. Coverage in this case can be partially, fully on top (FIG. 15), or overcoated (FIG. 16). Alternatively, the tracks 3a, 3b can be fully blackened by chemical change of their material, e.g. by oxidation if they are of an oxidizable material.

Manufacturing the Tracks:

As mentioned above, the tracks 3a, 3b can be applied to substrate 1 by means of non-contact ejection printing from a printing head, in particular by electrohydrodynamic ejection printing.

Suitable methods and printing heads are e.g. described in WO 2016/169956 or WO 2106/120381.

Electrohydrodynamic (EHD) ejection is particularly suited to generate thin tracks having a large aspect ratio r. In this case, the tracks are directly created by introducing a relative movement between print head and substrate that represents the intended line shape, while depositing droplets or other liquid elements (e.g. elongated jet-like liquid elements, which are common in EHD) containing the desired material. For example, to create a straight track, the relative movement is a linear motion. In case of a meandering track, the motion needs to be meandering as well (i.e. it is a multi-axis movement and not just a linear movement).

In the following, some aspects of this method are illustrated in more detail.

Figure 17:
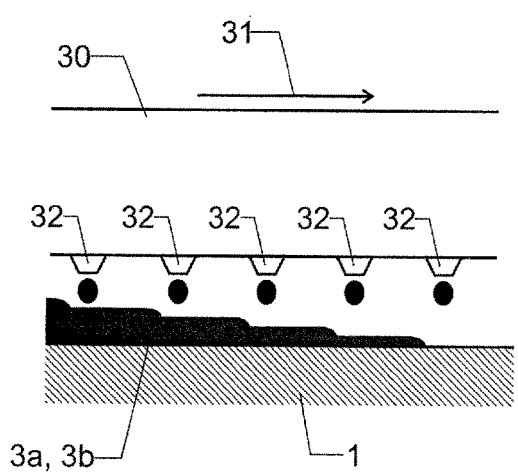
FIG. 17 illustrates, schematically, the manufacturing of a single track with a printing head having a plurality of nozzles along a line.

FIG. 17 shows a sectional view along the longitudinal direction of a track 3a, 3b on substrate 1 during printing. The figure further shows a printing head 30 located at a distance from substrate 1 and the direction 31 of displacement between printing head 30 and substrate 1.

Printing head 30 may e.g. be a printing head having a plurality of nozzles 32 as described in WO 2016/120381. The nozzles 32 used for printing a single track are advantageously arranged equidistantially along a straight line.

During movement along direction 31, the ejection of droplets from the nozzles 32 is tuned such that the distance between any two subsequently deposited droplets is smaller than the deposited diameter of the droplets themselves. In this way, the formed tracks are continuous. The deposition rate of droplets is such that the accumulation of liquid on substrate 1 and the evaporation of the liquid are kept at equilibrium state. Droplets are ejected at such frequency that the previous droplet is essentially evaporated before the next droplet arrives. However, in EHD ejection it is also possible to form continuous, fine jet-streams instead of individual liquid elements. This provides a particularly fast way of transferring liquid onto the substrate. In this case, the way to prevent liquid from accumulating is by moving quickly enough such that the liquid only accumulates to a width that is equal to the desired width of the tracks.

In general, the printing of tracks can follow the instruction provided in WO 2016/169956 or WO 2106/120381.

In a specific example, a substrate 1 of glass is used. A suitable printing ink for the tracks 3a, 3b is a silver nanoparticle ink, where silver nanoparticle are dispersed in a higher alkane, for example. The dielectric insulator 4 is printed using UV curable varnish. First, all tracks of the first set of tracks 3a is printed using a multinozzle print head. Subsequently, the same print head is used to print the dielectric insulators 4, which is followed by a short UV exposure to harden the varnish. This may be done by a UV light source that is integrated in the print head, i.e. the UV exposure can be performed without losing the registration between print head and substrate. Subsequently, the second set of tracks 3b is printed, wherein some of the tracks are printed to cross the hardened UV varnish. After printing, the structure is tempered at 100° C. for 10 minutes in order to anneal the silver nanoparticles into conductive tracks.

In other embodiments, the ink used for the tracks 3a, 3b may be a nanoparticle based metal ink where the nanoparticles are dispersed in a higher alkane by steric stabilization, or a metal salt ink or an ink containing metal particles or metal elements in other sorts of complexes. The printed inks may require a post-treatment in order for them obtain conductivity. Hence, after printing there may be a need for flash- or thermal annealing, or another method known to those skilled in the art. In case a touchscreen is formed on a single surface, it is preferable to exercise the annealing after printing of the full touchscreen, or in between, but without removing the substrate from the motion stage (otherwise the alignment between substrate and print head is lost). To print the dielectric layer, an ink with dispersed dielectric nanoparticles may be used, e.g. with dispersed $SiO_2$ or $Al_2O_3$ particles. The ink may also be of polymeric nature and be cured with UV light, for example. Curing is best exercised directly after printing. The dielectric layer may be further annealed together with the deposited conductive material.

EHD allows to easily generate tracks having rounded top surfaces as shown in FIG. 14 because the inherent surface tension of the ink before drying leads to bevel shape.

To accelerate printing, the number of nozzles 32 on head 30 can be increased. In particular, every nozzle 32 only prints one or several sub-elements of a single track, and the sub-elements printed by many nozzles will be combined into the final track as shown in FIG. 17.

In this case, as mentioned, the nozzles 32 printing a common track are arranged within a line. Along this direction, the nozzles are spaced by a length that is equal to an integer fraction of the length of the desired track or track-sub-elements along this direction. This allows to activate all nozzles at the same time, but the movement need not be along the whole length of the track but only along an integer multiple of the distance between subsequent nozzles on the print head. After a straight movement equal to the distance between two nozzles, individual sub-elements printed by the different nozzles will be connected to each other, and together they will form a track. The length of this track will be equal to the distance between nozzles multiplied by the number of nozzles that are arranged along movement direction.

If the movement is longer than distance between two nozzles 32, the sub-elements of several nozzles will combine with each other. This is advantageous to reduce undesired track faults due to non-functioning nozzles.

Figure 18:
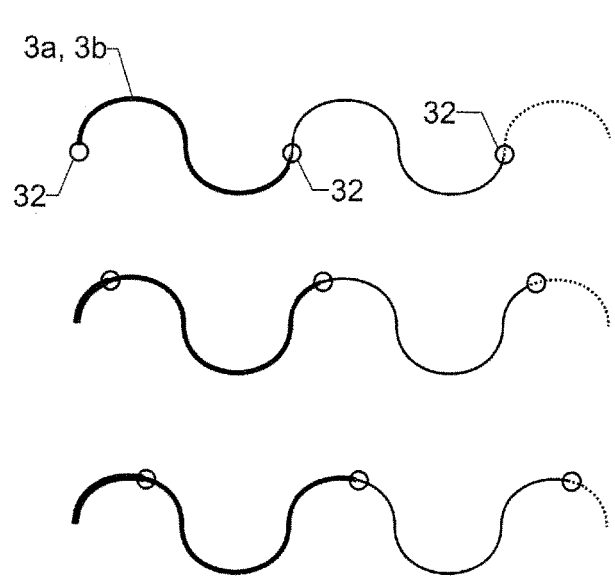
FIG. 18 illustrates, schematically, the manufacturing of a meandering track with such a printing head.

If a meander-shaped track is to be created, it is important that the period of the meander is an integer fraction of the distance between two neighboring nozzles 42. In this way, a meander-shaped movement can be executed while the sub-elements printed by individual nozzles still overlap with each other as illustrated in FIG. 18, where A, B, and C represent the printing process as seen from above at three different times, with A coming before B and B coming before C. The dotted line represents the desired meander-shaped path of the track. The growing height of the track after subsequent printing steps is illustrated by an increasing width of the solid line (note that, practice, the height of the line will change with each printed layer but, advantageously, not its width).

Nozzles 42 on print head 30 can be located wherever a track sub-element is required. In this way, nozzles can work together without requiring separate actuation. Instead, all nozzles are actuated at the same time, by the same electrical stimulus. This allows using millions of nozzles together, at minimal electronics complexity.

Hence, the present method advantageously comprises the step of generating several parallel tracks by continuously or repetitively printing from several nozzles while mutually moving said printing head along the substrate.

Further, the method may comprise the step of applying material from several, spaced-apart nozzles onto the same track. This allows to quickly build a track of high aspect ratio.

For printing a meandering track, the method may involve mutually moving the printing head and the substrate along a meandering path. The period of the meandering path is equal to, or an integer fraction of, the distance between neighboring ones of the several, spaced-apart nozzles, which allows to operate all nozzles with a single electrical pulse.

Further complexity may be introduced as required though, following the instructions of WO2016/169956. For example, it is possible to form nozzles and contacts to these nozzles such that the nozzles can be used to redundantly form a single track element. In this way, any track element will always rely not only on one but on several nozzles. This allows to substantially reduce the likelihood of unwanted track breakages due to non-functioning nozzles.

Manufacturing the Touch Sensor:

The tracks 3a, 3b of the touch sensor can be formed according to the previous section. Therefore, the first and second sets of tracks 3a, 3b can be regarded separately, and nozzles may be arranged on head 30 as above.

However, since the first and second sets of tracks are basically equivalent, their formation needs nozzles to be placed on a multinozzle print head in an inverse manner. In other words, the nozzles required for creating first set of tracks need to be placed on the print head at the location where no nozzles are required in the production of the second set of tracks. The only locations on the print head needing special attention are those generating the tracks at the crossing points between the two sets.

Hence, in principle, the nozzles for creating the two sets can be formed on a single print head. The nozzles only needed for creating the first set of tracks must be contacted to different voltage channels than the nozzles only needed for creating the second sets of tracks. The nozzles required at the crossing points need to be contacted to a third voltage channel. Hence, to control all the nozzles on the print head, a print head controller may supply at least three individually controllable voltage signals to the print head. Further division of the nozzles into different individually controllable types, for example, need to be made for nozzles dedicated to printing track elements in two different directions.

If the touch sensor is formed on a single surface, a multi-nozzle print head must also contain nozzles for printing the dielectric material 4 at the crossing points between two sets of tracks.

It is beneficial to have all the nozzles for creating a given touch sensor on the same print head. This allows production of the touchscreen without the need of any additional alignment processes. With conventional fabrication technologies, there is a need to perform at least two alignment procedures for manufacturing such touch sensors: one for forming the dielectric islands and the second one for forming the second set of tracks.

In the present case, the same print head can first print the first set of tracks 3a, then it can print the dielectric insulators 4, and finally it can print the second set of tracks 3b. As long as the initially known relative position between print head and substrate is not changed, only precise displacements between print head and substrates may be required, but no alignment.

Hence, a print advantageously contains, in addition to the nozzles that form the first and second tracks, also nozzles that form the dielectric islands. Those nozzles deliver a different ink from the one delivered by the nozzles printing the tracks.

To save space on the print head, the dielectric-printing nozzles may be formed at the location of a track printing nozzle. The fact that one track printing nozzle is missing on the print head can be alleviated by the introduction of redundancy. This means that any given track element of the tracks is printed by at least two nozzles. As a result, at the absence of a single nozzle, a track element generated by said nozzle will be thinner but not completely absent.

Hence, for generating structures with intersecting tracks of two sets, the method may comprise the steps of
  printing the first set of tracks along a first direction, and
  printing the second set of tracks, using the same printing head, along a second direction.

In this case, the second direction is advantageously perpendicular to the first direction.

Further, if insulators are to be positioned between at least some of the crossing points between the tracks, the method may comprise the step of applying the electrical insulators 4 at at least some crossing points between the first and said second sets of tracks, with the insulators 4 being applied using the same printing head as used for printing the first and second sets of tracks. This again obviates the need for a separate alignment step.

Nozzles for creating the busbars 8a, 8b and busbar tracks 10 can be formed on the same print head, and they can be operated in parallel to produce the respective sets of tracks. Because the busbars 8a, 8b and busbar tracks 10 are advantageously wider than the first and second sets of tracks, the nozzles for the busbars 8a, 8b and busbar tracks 10 may need to print at much higher throughput in order to complete their track elements in the same amount of time as the nozzle dedicated to printing the first and second sets of tracks. This can be achieved by selectively providing larger nozzles or by operating them at different voltage level, for example. Method to produce print heads with different nozzles size can be found in WO 2016/120381 Furthermore, it may be beneficial to use a solvent with a higher evaporation rate such that the higher flow rate of these nozzles does not track to a flooding of liquid on the print head.

When manufacturing a conductor assembly or touch screen with a randomized (or pseudo-randomized) spacing of the tracks, such as the one shown in FIG. 5, the locations of the nozzles on the printing head need to be randomized, too.

Figure 19:
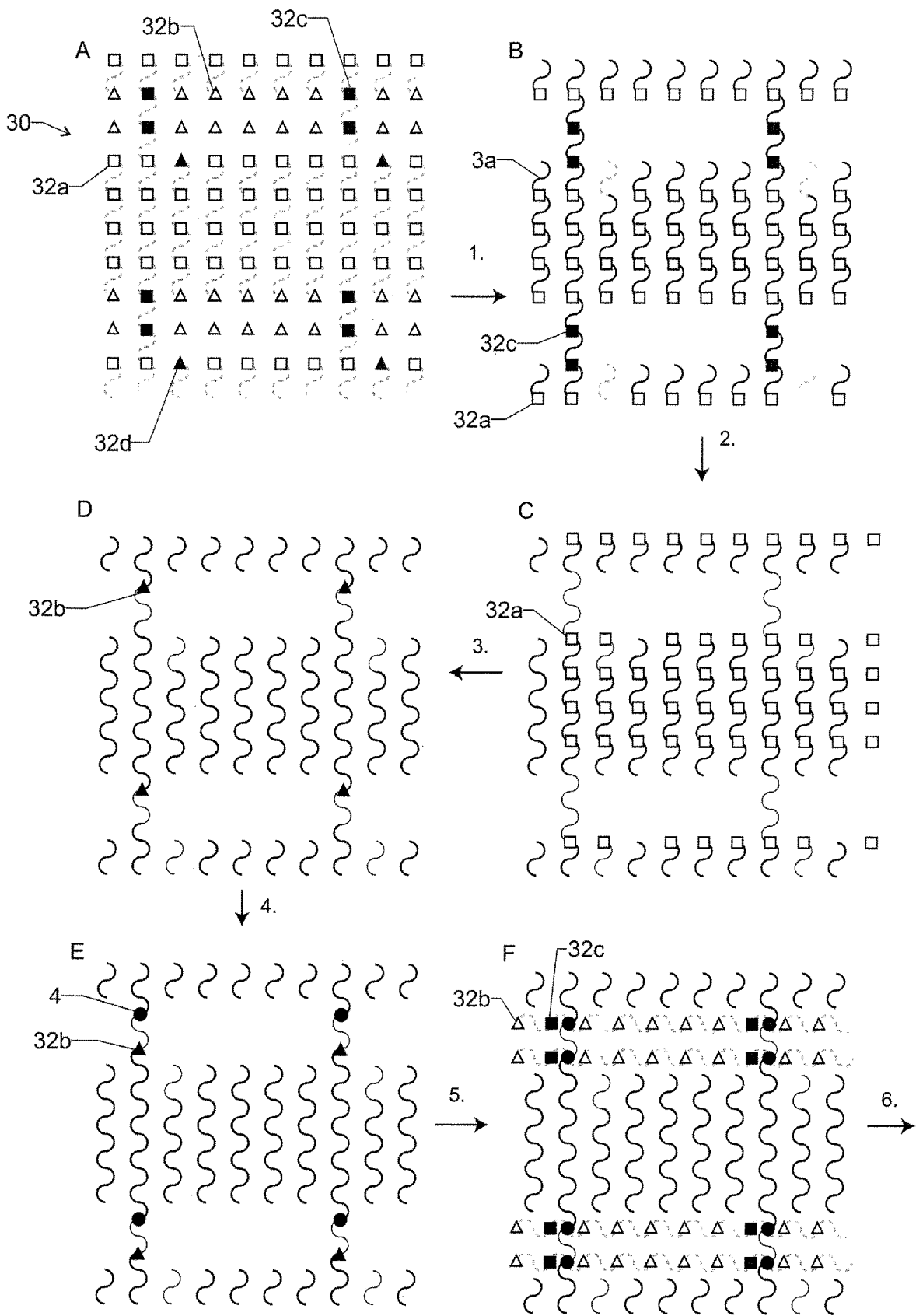
FIG. 19 shows a possible series of steps and a printing head for manufacturing a conductor assembly.
Figure 20:
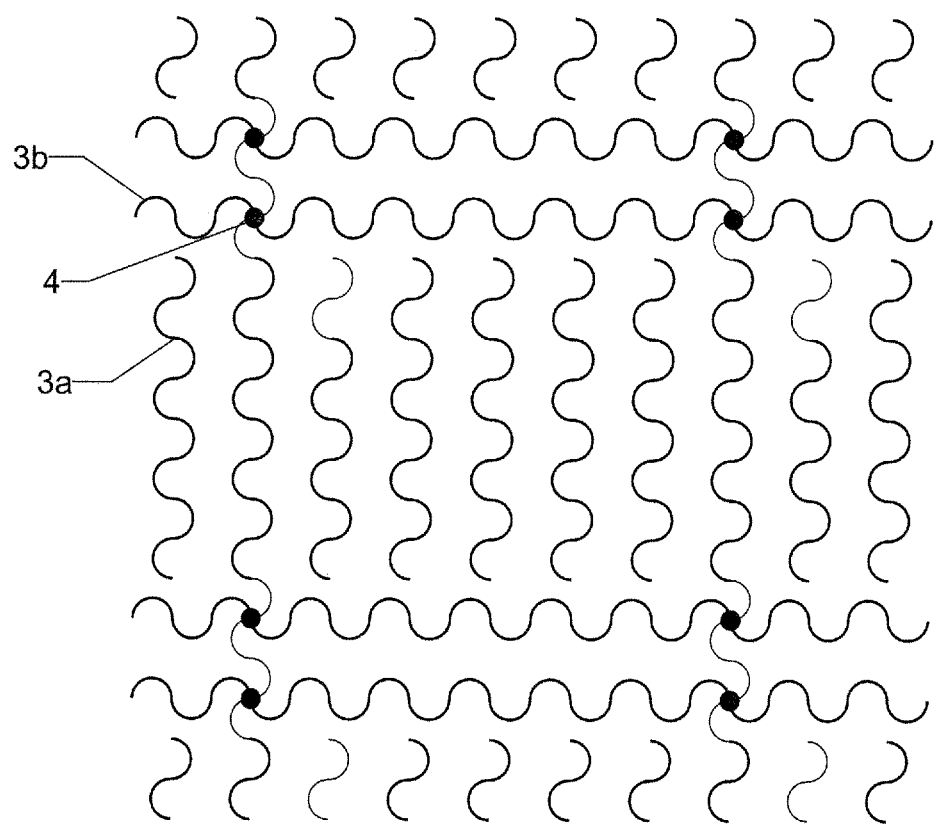
FIG. 20 shows the finished conductor assembly of the steps of FIG. 19.

A specific embodiment of the arrangements of nozzles on a printing head and the steps for manufacturing a conductor assembly are illustrated in reference to FIGS. 19 and 20.

The steps illustrated in FIG. 19 can be carried out for manufacturing the conductor assembly shown in FIG. 20.

Section A of FIG. 19 shows the nozzles 32a-32d of printing head 30. Even though all nozzles may typically have the same shape (e.g. a rounded shape), they are shown with different shapes and coloring in FIG. 19 to illustrate their different functions:

- A first set 32a of nozzles (shown as white squares) are exclusively used to print the first set of tracks 3a.
- A second set 32b of nozzles (shown as white triangles) are exclusively used to print the second set of tracks 3b.
- A third set 32c of nozzles (shown as black squares) are used for printing both the first and second set of tracks 3a, 3b.
- A fourth set 32d of nozzles (shown as black triangles) are used for printing the insulators 4.

The nozzles of the first through third sets 32a, 32b, 32c deliver ink for forming the tracks. The nozzles of the fourth set 32d deliver ink for forming the insulators 4.

All nozzles of a single set can be operated with the same control signal. The nozzles of the different sets can be operated with different control signals.

Each of the sections A to F of FIG. 19 shows, in dashed lines, the tracks to be printed in the next step. Sections B to F show these steps at their end, and they show only the nozzles operated during that step and, in solid lines, the tracks printed so far.

As shown in section B, the first steps involves moving the printing head along the direction of the first set of tracks 3a, in meandering fashion, while operating the nozzles 32a and 32c, thereby printing a part of the first set of tracks 3a.

The sections of the tracks 3a under the insulator nozzles 32d remain unprinted during the first step. Hence, the head is now moved one width W to the right in order to move the insulator nozzles 32d over a printed section of the tracks, and then the head is moved, in meandering fashion, vertically up by one width W in order to print the missing sections of the tracks 3a using the nozzles 32a, as shown in section C.

Next, and as shown in sections D and E, the insulators 4 are printed using the insulator nozzles 32d.

Finally, and as illustrated in section F, the tracks 3b are printed while moving the head horizontally, in meandering fashion, and operating the nozzles 32b, 32c.

The resulting conductor assembly is shown in FIG. 20.

NOTES

The randomized (or pseudo-randomized) spacing of the tracks 3a, 3b as shown in FIG. 5 can be used with any of the embodiments herein. For example, any of the embodiments of FIGS. 6-11 may use a randomized track spacing.

In an advantageous embodiment, the tracks of the two sets of tracks 3a, 3b have equal width and equal cross section.

However, in one embodiment, the cross sections may vary. For example, the cross sections of tracks may be adjusted according to their individual capacitive load, i.e. to keep the charging time RC constant, a larger cross section can be formed for a track that has a higher capacitive load than other tracks. To maintain good optical uniformity, the cross-sections are advantageously varied by means of adjusting the track thickness. However, in this case, some nozzles may require for longer printing times and separate control signals. Therefore, from a manufacturing point of view, it can be advantageous to vary track cross-section by means of the track width. In this case, wider tracks may be printed by larger nozzles, wherein an increase in nozzle size generally leads to wider tracks but also to higher printing throughput. The width of tracks can also be adjusted to compensate for a higher density of tracks and the related problems associated with optical uniformity. For example, within an area of W×W at the crossing points, the density of tracks is commonly about twice as high as in other regions of the assembly. Hence, tracks formed within this area section may be formed with half the width of all tracks outside of those regions.

Hence—in many embodiments and in more general terms—the cross-sections of all tracks of the first and/or second sets may be equal, e.g. with a variation of less than 10%.

However, in other embodiments, some of the tracks of the first and/or second set may have cross-sections at least 50%, in particular at least 100% larger other tracks of the same and/or other set.

While there are shown and described presently preferred embodiments of the invention, it is to be distinctly understood that the invention is not limited thereto but may be otherwise variously embodied and practiced within the scope of the following claims.

The invention claimed is:

1. An optically transparent conductor assembly comprising:
   a transparent substrate defining perpendicular directions X and Y in a plane of said substrate,
   a plurality of conducting tracks of a non-transparent material positioned on said substrate, wherein at least some of said tracks are members of a first set of tracks and are parallel to each other along said direction X,
   wherein the tracks have a width of less than 10 um,
   wherein, for each of said tracks, and along both said directions X and Y, a distance between said track and a next one of said tracks is less than 200 µm; and
   wherein, in a sectional view extending perpendicularly to a longitudinal direction of each track, a surface of the tracks facing away from said substrate is rounded, and
   wherein a largest curvature of over at least 50% of said surface is no more than the width of said track.

2. The conductor assembly of claim 1, wherein the width of said tracks is less than 5 µm and/or wherein said distance is less than 100 µm.

3. The conductor assembly of claim 1, wherein the distance between any two parallel tracks is at least 10 pm.

4. The conductor assembly of claim 1, wherein the distances between neighboring parallel tracks closer than 200 µm have a standard deviation of no more than 30% of an average value of said distances.

5. The conductor assembly of claim 4, wherein said standard deviation is at least 5% of said average value of the distances.

6. The conductor assembly of claim 1, wherein at least some of said tracks are meandering,
   with a period of
      less than said distance between neighboring tracks and/or
      less than 400 µm.

7. The conductor of claim 6, wherein a period of said meandering tracks is equal to said distance or to an integer fraction of said distance.

8. The conductor assembly of claim 6, wherein all parallel tracks follow identical meanders.

9. The conductor assembly of claim 1, wherein said tracks are covered with optically absorbing cover layers on at least one side of the assembly.

10. The conductor assembly of claim 1, wherein some of said tracks are members of a second set of tracks,
wherein the tracks of said second set of tracks are parallel to each other and wherein said first and second sets of tracks intersect and form individually addressable sensing regions,
and wherein said first and said second set of tracks-extend perpendicularly to each other, and/or wherein a distance between neighboring tracks of said second set is equal to the distance between neighboring tracks of said first set.

11. The conductor assembly of claim 10,
wherein said first and said second set of tracks are commonly mounted to the substrate or
wherein said first and said second set of tracks, or part of them, are mounted on different surfaces of the substrate.

12. The conductor assembly of claim 10,
wherein a plurality of crossing points are formed where the tracks of the first and the second set interact,
wherein at least at a first set of said crossing points, said conductor assembly comprises a dielectric insulator electrically insulating the tracks of the first and the second sets.

13. The conductor assembly of claim 12, wherein at a second set of said crossing points, the tracks of one set of tracks are electrically connected to the tracks of the other set of tracks.

14. The touch sensor of claim 1,
wherein, in a projection perpendicular to a surface of said substrate and averaged over areas of 200 μm×200 μm, a standard deviation of an area not covered by said tracks is less than 10%.

15. A touchscreen comprising the conductor assembly of claim 1.

16. A method for manufacturing the conductor assembly or the touch sensor of claim 1, comprising: applying said tracks to said substrate using non-contact ejection printing from a printing head, electrohydrodynamic ejection printing.

17. The method of claim 16, further comprising generating several parallel tracks by continuously or repetitively printing from several nozzles while mutually moving said printing head along said substrate.

18. The method of claim 17, further comprising applying material from several, spaced-apart nozzles onto the same track.

19. The method of claim 18, wherein said printing head and said substrate are mutually moved along a meandering path, thereby generating tracks that are meandering, wherein a period of said meandering track is equal to, or an integer fraction of, a distance between neighboring ones of said several, spaced-apart nozzles.

20. The method of claim 16 comprising:
printing a first set of tracks along a first direction, and
printing a second set of tracks, using the same printing head, along a second direction,
and wherein said second direction is perpendicular to said first direction.

21. The method of claim 20, further comprising applying electrical insulators at at least some crossing points between said first and said second sets of tracks, wherein said insulators are applied using the same printing head.

22. An optically transparent conductor assembly comprising:
a transparent substrate defining perpendicular directions X and Y in a plane of said substrate,
a plurality of conducting tracks of a non-transparent material positioned on said substrate, wherein at least some of said tracks are members of a first set of tracks and are parallel to each other along said direction X,
wherein the tracks have a width of less than 10 μm,
wherein, for each of said tracks, and along both said directions X and Y, a distance between said track and a next one of said tracks is less than 200 μm; and
wherein a ratio r=h/w between
a height h of said tracks in a direction perpendicular to said substrate and
a width w of said tracks in a direction perpendicular to a longitudinal direction of each track and parallel to a surface of said substrate
is, for at least some of said tracks, at least 0.5, and/or no more than 10.

23. A touch sensor or fingerprint sensor comprising:
a conductor assembly, comprising:
a transparent substrate defining perpendicular directions X and Y in a plane of said substrate,
a plurality of conducting tracks of a non-transparent material positioned on said substrate, wherein at least some of said tracks are members of a first set of tracks and are parallel to each other along said direction X,
wherein the tracks have a width of less than 10 μm, and
wherein, for each of said tracks, and along both said directions X and Y, a distance between said track and a next one of said tracks is less than 200 μm,
wherein some of said tracks are members of a second set of tracks,
wherein the tracks of said second set of tracks are parallel to each other,
wherein said first and second sets of tracks intersect and form individually addressable sensing regions,
and wherein said first and said second set of tracks extend perpendicularly to each other, and/or wherein a distance between neighboring tracks of said second set is equal to the distance between neighboring tracks of said first set, and
said touch sensor further comprising:
a controller having transmission outputs and sensing inputs, wherein at least part of said first set of tracks is connected to said transmission outputs and at least part of said second set of tracks is connected to said sensing inputs,
wherein said touch sensor comprises a plurality of individually addressable sensing regions formed by the intersections of transmission and sensing bands,
wherein each transmission band comprises at least one unbroken track of said first set of tracks extending all over the touch sensor and each sensing band comprises at least one unbroken track of said second set of tracks extending all over the touch sensor,
wherein at least one of said bands and/or all of said sensing bands, comprise at least two tracks extending all over said touch sensor,
wherein, in at least one of said sets of tracks, some of the tracks are interrupted at locations where they intersect the tracks of the other set of tracks, and wherein an added distance between the ends of said interrupted tracks and the closest track of the other set is equal to the distance between neighboring interrupted tracks.

24. The touch sensor of claim 23, wherein at least some of said interrupted tracks are tracks of said second set and are connected to an unbroken track of said first set, and wherein some of said interrupted tracks are tracks of said first set and are left floating or are connected to an unbroken track of the second set.

* * * * *